Nov. 23, 1943.  W. H. PETIT  2,334,953
ACCOUNTING MACHINE
Filed Aug. 24, 1936  10 Sheets-Sheet 1

Nov. 23, 1943.    W. H. PETIT    2,334,953
ACCOUNTING MACHINE
Filed Aug. 24, 1936    10 Sheets-Sheet 2

Inventor
William H. Petit
By Earl Beust
His Attorney

Nov. 23, 1943.                W. H. PETIT                2,334,953
                          ACCOUNTING MACHINE
                         Filed Aug. 24, 1936        10 Sheets-Sheet 5

William H. Petit
Inventor
By Carl Benst
His Attorney

Nov. 23, 1943.                 W. H. PETIT                        2,334,953
                            ACCOUNTING MACHINE
                           Filed Aug. 24, 1936            10 Sheets-Sheet 6

William H. Petit
Inventor

By *Karl Benst*
His Attorney

Nov. 23, 1943.                W. H. PETIT                 2,334,953
                          ACCOUNTING MACHINE
                          Filed Aug. 24, 1936           10 Sheets-Sheet 7

William H. Petit
Inventor

By Earl Benst
His Attorney

Nov. 23, 1943.  W. H. PETIT  2,334,953
ACCOUNTING MACHINE
Filed Aug. 24, 1936  10 Sheets-Sheet 9

FIG. 16B

William H. Petit
Inventor
By Earl Benst
His Attorney

Patented Nov. 23, 1943

2,334,953

UNITED STATES PATENT OFFICE 2,334,953

ACCOUNTING MACHINE

William H. Petit, Dayton, Ohio, assignor to The National Cash Register Company, Dayton, Ohio, a corporation of Maryland Application August 24, 1936, Serial No. 97,564

11 Claims. (Cl. 235—60)

This invention relates to bookkeeping or accounting machines and the like and is particularly directed to machines of the type illustrated and described in Letters Patent of the United States No. 1,197,273 and No. 1,203,863, issued respectively September 5, 1916, and November 7, 1916, to Halcolm Ellis, and Patent No. 1,819,084, issued August 18, 1931, to Emil John Ens.

The present invention comprises an auxiliary keyboard applied to the well known Ellis type of accounting machine illustrated and described in the above patents, and in its present adaptation, is arranged as a bank service machine used for balancing individual checking accounts. However, it is not the desire to restrict the use of this invention to the Ellis type of machine, as it may be easily applied to various other machines; neither is it the desire to limit this invention to any particular business system, as it may easily be adapted for use in practically any present-day business system.

In order that accounting machines may be used successfully in present-day complex business systems, involving large amounts, it is necessary that such machines have a high capacity keyboard arranged as compactly as possible. Various methods have been used heretofore to accomplish this result. The present invention comprises an auxiliary keyboard in which have been incorporated the date keys, the symbol keys, and a ribbon control key ordinarily referred to as the "black" key. The auxiliary keyboard permits the elimination from the main keyboard of all keys commonly referred to as "printing keys," and the space thus acquired may be utilized for additional rows of amount keys, check counting keys, or the like. Obviously, the auxiliary keyboard may be used for other purposes than for date printing and symbol printing keys. For example, this additional keyboard space may be used for amount keys, check counting keys, etc.

With the above brief introductory statement in mind, it is broadly an object of this invention to increase the keyboard capacity of machines of the class referred to above by incorporating therein an auxiliary keyboard.

Another object of this invention is the provision of novel means whereby a plurality of rows of keys control a single actuator.

Another object is the provision of means to control the zero latch for a single actuator by a plurality of rows of keys.

An object of this invention is to supply means to automatically release the keys of the auxiliary keyboard.

A further object is to provide manual means for releasing the keys of the auxiliary keyboard.

A still further object is the provision of means for locking the keys of the auxiliary keyboard against release or depression during machine operation.

Another object is to provide means for controlling the manual and automatic release of certain keys.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

GENERAL DESCRIPTION

The novelty of the present invention resides in an auxiliary keyboard for accounting machines of the type referred to at the beginning of this specification. The auxiliary keyboard is located directly in front of the main keyboard, is supported by an extension of the regular machine base, and is enclosed in a suitable extension of the machine's case or cabinet. In the embodiment shown, the auxiliary keyboard includes month, day, and year keys, a plurality of symbol printing keys, and a "black" key. The "black" key and its associated mechanism will be thoroughly treated in a separate application and therefore will be treated only in a general way herein. By removing the date keys and the symbol keys from the main keyboard, space is provided for additional rows of keys, which materially increases the keyboard capacity of the machine. The keys of the auxiliary keyboard are not limited to the uses outlined above but may, with minor alterations, be utilized for any desired purpose, such as, amount entering, or as control keys.

The keys of the auxiliary keyboard are arranged in groups containing from three to twelve keys, each group controlling its respective actuator which in turn positions a printing sector commensurate with the value of the depressed key. The month group consists of three rows of four keys each, the tens of days group consists of a single row of three keys, the units of days group consists of three rows of three keys each, and the year group consists of a single row of four keys. The date keys are stay-down keys in that they are not automatically released at the end of each machine operation but may be manually released by means of a "release" key incorporated in the auxiliary keyboard.

The symbol keys consist of two rows of four keys each, which control the positioning of a symbol actuator, which in turn positions a symbol type sector in accordance with the depressed symbol key. The symbol keys are automatically released at the end of each machine operation and furthermore may be manually released by means of the regular "release" key incorporated in the main keyboard of the machine. A manually operated device is provided for controlling the automatic and manual release of the symbol keys.

The mechanism of the auxiliary keyboard will now be described in detail:

DETAILED DESCRIPTION

Frame work

Figures 3, 4:
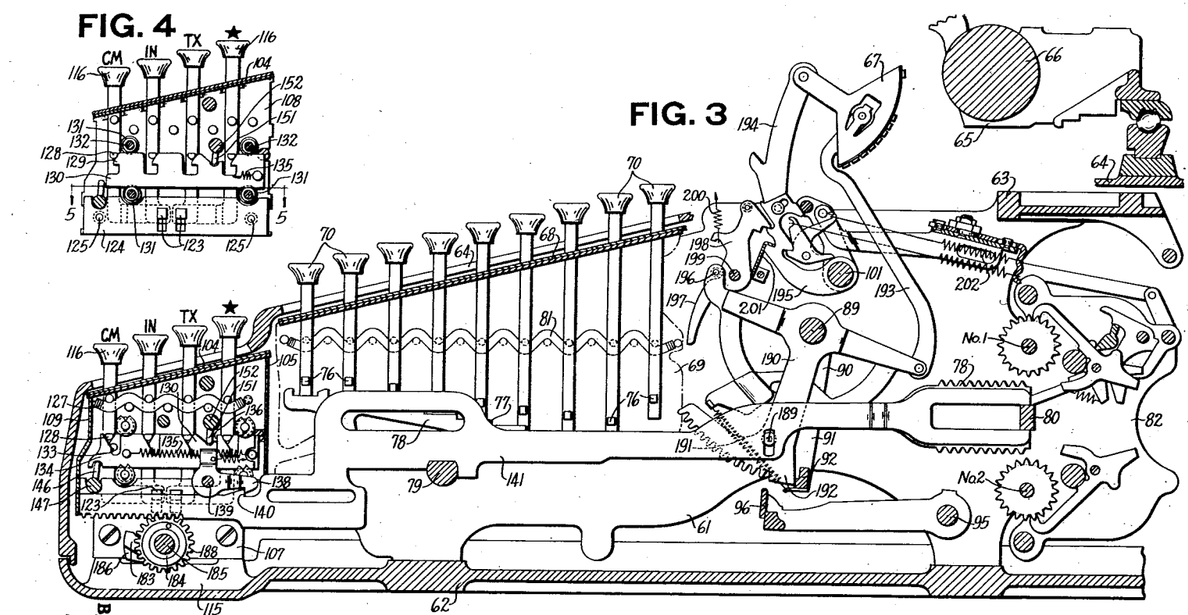
Fig. 3 is a longitudinal sectional view taken just to the right of one of the amount banks of the main keyboard and along line 3—3, Fig. 6B, of the auxiliary keyboard.
Fig. 4 is a sectional view of one of the rows of keys of the auxiliary keyboard.
Figure 18:
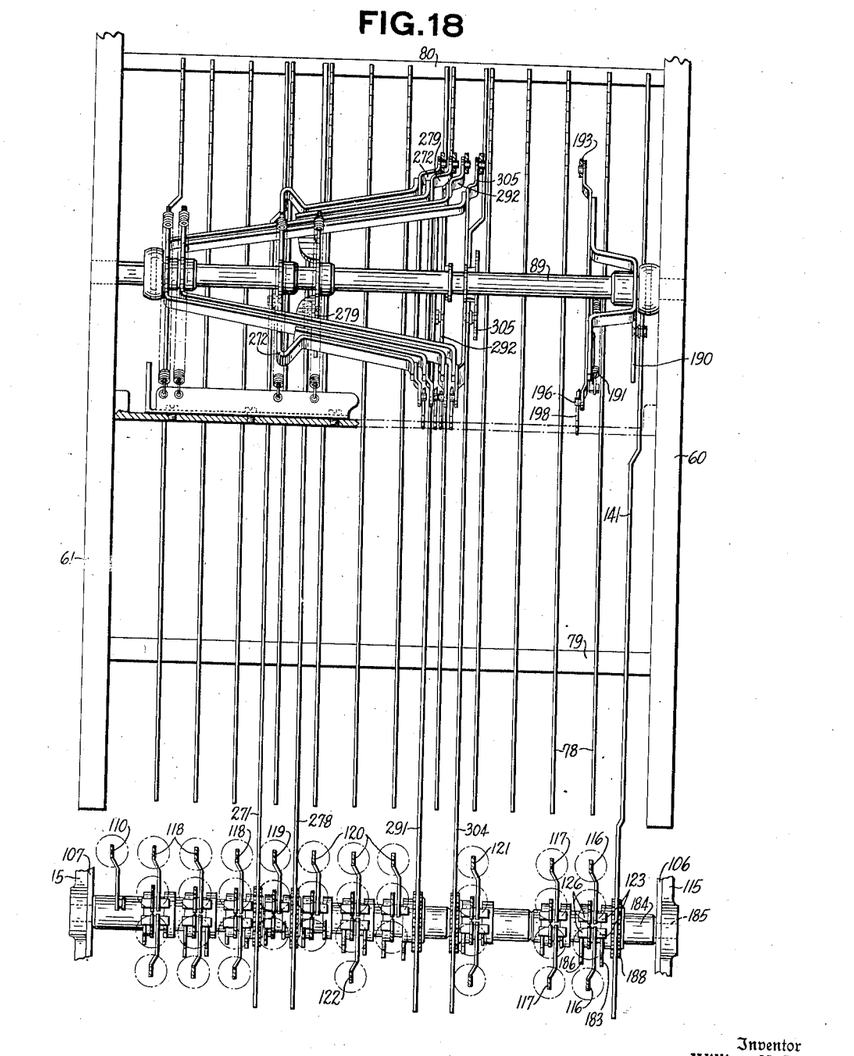
Fig. 18 is a top plan view showing in particular the actuators for the auxiliary and main keyboards and the manner in which they position their respective printing sectors.

Referring to Figs. 3 and 18, the mechanism of the machine embodying this invention is supported by a right frame 60 and a left frame 61, mounted upon a machine base 62, and rigidly held in alignment by means of a cross frame 63 and various other cross frames, rods, and shafts. The mechanism of the machine, including the main and the auxiliary keyboards, is enclosed in a suitable case or cabinet 64, which is in turn secured to the machine base 62. A traveling carriage 65, similar to that used on typewriters, is supported for lateral movement by means of ways thereon in cooperation with corresponding ways mounted upon the top of the case 64. The traveling carriage 65 rotatably supports a platen roll 66 which presents record material to the recording means which includes an inking ribbon, not shown, and a plurality of type sectors including a symbol type sector 67.

Main keyboard and operating mechanism

The frame work of the main keyboard of the instant machine comprises a top plate 68, a right and a left end plate, not shown, and a partition plate 69 for each row of keys, and said keyboard frame work is secured to the frames 60 and 61 by means of the plate 68. The keys of the main keyboard include a plurality of denominational rows of amount keys 70 (Figs. 1 and 3), a row of control keys 71, an "overdraft" key 72, a "vertical" feed starting bar 73, a regular starting bar 74, and a "skip" tabulating starting bar 75.

Depressing one of the amount keys 70 (Fig. 3) against the tension of a spring 81, moves a stud 76 in the lower end of the stem thereof into the path of a corresponding graduated step 77 on the forward end of an actuator rack 78, mounted for horizontal sliding movement by means of a slotted rod 79 and notched bar 80, both of which are supported by the frames 60 and 61. The right hand end of the actuator 78, as here viewed, has two sets of rack teeth arranged to cooperate respectively with a corresponding wheel of a No. 1 or balance totalizer and a corresponding wheel of a No. 2 or adding totalizer. The No. 1 and No. 2 totalizers are mounted in a frame work 82 attached to the rear of the frames 60 and 61. While only two totalizers are here shown, it is but a matter of assembly to add additional totalizers by attaching the frame work thereof to the totalizer frame 82.

The different totalizers are selected for addition and the machine is conditioned for adding operations by means of stops (not shown) mounted upon the traveling carriage 65, in cooperation with hanging bar levers, not shown. These stops also are tabulating stops and locate the different columns of the record material opposite the type sectors. The stops on the travelling carriage are also used to condition the balance totalizer for subtract operations. The different totalizers are selected and the machine is conditioned for nonadd, sub-total, total, and subtract operations by means of the control keys 71. For further details of this mechanism, attention is directed to the United States patent to Emil John Ens, No. 1,819,084.

One cycle of movement of a main operating shaft 83 (Fig. 17) is required to operate the machine in non-adding, adding, subtracting, and sub-total and total operations, and three cycles of movement of said main shaft are required for overdraft operations. The main shaft 83 is journaled in the frames 60 and 61 and has secured to its right end an arm 84 connected by a link 85 to the driven memebr of a clutch device (not shown) the driving member of which is operatively connected to an electric motor of conventional design but preferably one of the character illustrated and described in Letters Patent of the United States No. 1,601,102, issued September 28, 1926, to F. W. Bernau.

Depressing any one of the starting bars 73, 74 or 75 (Figs. 1) causes the motor clutch mechanism to become effective to operate the main shaft 83 through one cycle of movement. Furthermore, depressing the "vertical" starting bar 73 causes the platen roll 66 (Fig. 3) to be revolved to linespace the record material wound therearound and the "skip" tabulating starting bar 75 causes the travelling carriage 65 to be skip tabulated to a predetermined column. This mechanism forms no part of this invention and will not be described herein. For further details of this mechanism, see the United States patent to Raymond A. Christian, No. 2,082,098, filed June 25, 1934, and issued June 1, 1937. One cycle of movement of the main shaft 83 consists of an oscillatory movement, first counter-clockwise and back to normal position, through an approximate angle of 60 degrees. After the shaft 83 has completed its cycle of movement the motor clutch mechanism is automatically renderered ineffective and the depressed starting bar is restored upwardly to normal position.

Oscillating movement of the main shaft 83 (Fig. 17) and the arm 84, by means of a roller 86 carried by said arm 84 in cooperation with a cam slot 87 in a plate 88 secured on the right-hand end of a leading frame shaft 89 journaled in the frames 60 and 61, causes said plate 88 and said shaft 89 to rock first counter-clockwise and then back to normal position. A leading frame 90 (Fig. 3) has downwardly extending arms 91, secured to the shaft 89, which support a leading frame bail 92 which is resiliently connected to the actuator 78.

In non-adding, adding and subtracting operations the initial movement counter-clockwise of the shaft 89 and the leading frame 90 causes the actuator 78 to move in unison therewith until one of the graduated steps 77 thereon engages the corresponding square stud 76 in the depressed amount key 70. This positions the actuator 78 in accordance with the depressed amount key and said actuator in turn positions the amount type sector for that particular bank, which is similar in every respect to the symbol type sector 67 here shown. After the amount actuator 78 and the type sector therefor have been positioned, the roller 86 (Fig. 17) in cooperation with a cam slot 93 in an arm 94 secured on an aligner shaft 95 journaled in the frames 60 and 61, rocks said arm 94 and said shaft 95 clockwise to cause an aligning bar 96 (Fig. 3) to align and retain the actuator 78 and its printing sector in set positions.

The arm 84 (Fig. 17) carries a stud 97 which normally engages a notch in a link 98, the upper end of which is connected to an arm 99, on an extension of an arm 100 secured on a printer operating shaft 101 journaled in the right frame 60 and the frame work of the printer mechanism. The arms 99 and 100 are flexibly connected to each other by means of a spring 102 stretched therebetween. After the amount actuators and their corresponding printing sectors have been positioned and aligned, as explained above, initial movement clockwise of the shaft 101, under influence of the arms 100 and 99 and the link 98, releases said spring sectors to the action of a spring which causes said printing sectors in cooperation with an inking ribbon (not shown) to imprint the value of the depressed amount keys upon the record material carried by the platen roll 66.

It will be noted that the configuration of the cam slot 87 (Fig. 17) causes the plate 88 and the shaft 89 to dwell after they have completed their initial movement counter-clockwise. In adding operations during this dwell of the shaft 89, the wheels of the selected totalizer or totalizers are engaged with the actuators 78 and return movement forwardly of said actuators, under influence of the leading frame bail 92, rotates the wheels of said selected totalizer or totalizers to add therein the amount set up on the keyboard. After the actuators 78 have completed their return movement forwardly the wheels of the selected totalizer or totalizers are disengaged therefrom.

In subtract operation the wheels of the No. 1 or balance totalizer are engaged with the actuators 78 prior to their initial movement rearwardly and said wheels are therefore rotated in a reverse direction to subtract therefrom the amount set up on the keyboard. After the actuators 78 have completed their initial movement rearwardly the wheels of the balance totalizer are disengaged therefrom.

In subtotal and total operations the wheels of the selected totalizer are engaged with the amount actuators 78 prior to their initial movement rearwardly, which movement rotates said wheels reversely until the teeth of tripping cams, secured thereto, contact the teeth of the corresponding add transfer pawls for said totalizer. This locates the totalizer wheels at zero and positions the actuators 78 in accordance with the amount on said totalizer wheels. In total operations the totalizer wheels are moved out of engagement with the actuators 78 prior to their return movement forwardly and consequently remain at zero. In subtotal operations the wheels of the selected totalizer remain in engagement with the actuators 78 during their return movement forwardly and are consequently returned to their original positions.

The "overdraft" key 72 (Fig. 1) is normally locked against depression. However, occurrence of an overdraft in the No. 1 or balance totalizer unlocks said "overdraft" key 72 and simultaneously locks the "balance" key and the "subbalance" key 71 against depression, thus notifying the operator that the balance totalizer has been overdrawn. Depressing the "overdraft" key 72 releases the machine for an overdraft operation consisting of three cycles of movement of the shaft 83 (Fig. 17) and all of the machine mechanism with the exception of the printer mechanism. During these three cycles of movement the complementary amount of the overdraft is transposed to a true negative balance and this true negative balance printed upon the record material wound around the platen roll 66. It is unnecessary for the printing mechanism to function during the first two cycles of an overdraft operation, consequently the link 98 (Fig. 17) is shifted out of engagement with the stud 97 into engagement with a stationary stud 103 by mechanism, not here shown but well known in the art, and remains thus disengaged until the final or third cycle of an overdraft operation, when said link 98 is again engaged with the stud 97 to cause the printing mechanism to function, to record the true negative balance. For further details of the mechanism used in overdraft operations, see the United States patent to Charles L. Lee, No. 2,079,355, filed April 14, 1932, and issued May 4, 1937.

AUXILIARY KEYBOARD

The auxiliary keyboard, which forms the novelty of the present invention, is a self-contained unit mounted directly in front of the regular keyboard. As previously stated, this keyboard includes date printing keys and symbol printing keys. However, the uses to which the keys of the auxiliary keyboard are put are discretionary and this additional keyboard space may, with slight alterations, be used for any desired purpose. The date and the symbol printing keys are arranged in groups composed of one, two, and three rows of keys and each group of keys controls the positioning of its corresponding actuator, which in turn positions the printing sectors for the respective groups of keys in proportion to the amount of movement allowed by the depressed keys.

The symbol keys are automatically released at the end of each machine operation but this releasing may be controlled by means of a manually set device. The symbol keys may be manually released at will by means of the regular "release" key 71 (Fig. 1) which also releases the keys of the main keyboard. The date keys are not automatically released at the end of the machine operation but these keys may be manually released at will by means of a "release" key incorporated in the auxiliary keyboard. Located on the extreme left of the auxiliary keyboard is a "black" key 110 which controls the bichrome inking ribbon in subtract operations. Depressing the "black" key causes subtractive items, which are usually printed in red, to be printed in black. As the "black" key and its associated mechanism are fully described in a separate application, further mention of this key will not be made herein.

The auxiliary keyboard will now be described in detail.

Auxiliary keyboard frame work

Directing attention to Figs. 1, 3, 6A and 6B, the frame work of the auxiliary keyboard comprises a top plate 104, a back plate 105, right and left end plates 106 and 107, and a plurality of partition plates 108, equally spaced between the end plates 106 and 107, and arranged to assist in supporting the various rows of keys. The auxiliary keyboard frame work also includes a front plate 109 which is connected to the end plates 106 and 107, as also is the back plate 105. The end plates 106 and 107 are fastened, by screws, to extending lugs 115 of the machine base 62, thereby rigidly securing the auxiliary keyboard assembly to the machine proper.

Date and symbol keys

The keys of the auxiliary keyboard comprise two rows, of four keys each, of symbol keys 116 and 117 (Figs. 1, 3, 10, 16A and 16B), three rows, of four keys each, of month keys 118, one row of three tens of days keys 119, three rows, of three keys each, of units of days keys 120, one row of four year keys 121, and a "release" key 122 for the date keys. Inasmuch as the date keys and the symbol keys operate in substantially the same manner to position their respective actuators, it is believed that a description of the symbol keys and their associated actuator and printing mechanism will be sufficient for the present purpose.

Figures 5, 8, 10:
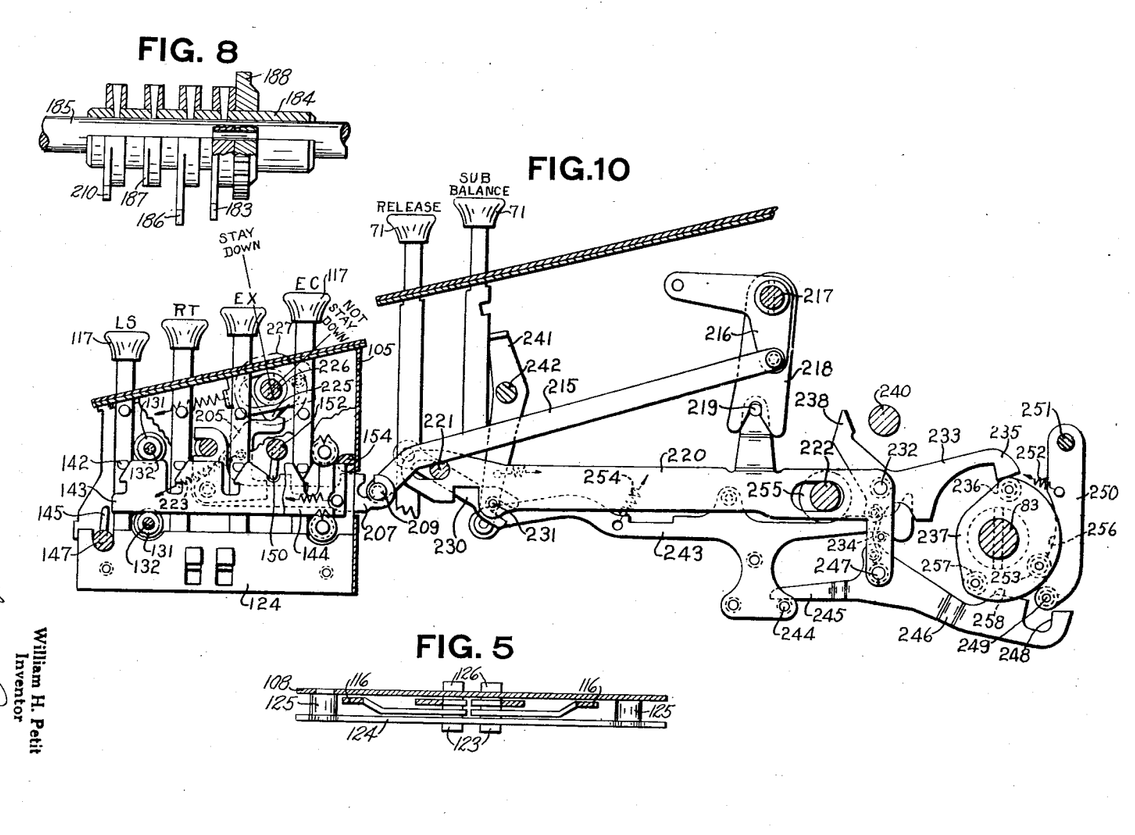
Fig. 5 is a sectional view taken along line 5—5 Fig. 4 showing a top plan view of the stems of the keys.
Fig. 8 is a detail view, partially sectioned, of the actuator control cam shown in Fig. 7.
Fig. 10 is a sectional view along line 10—10 Fig. 6B showing the key releasing mechanism for the auxiliary keyboard.

The upper ends of the symbol keys 116 and 117, Figs. 3, 4, and 5, extend through openings in the top plate 104. The right angled extensions of the lower end of the "star" symbol key 116 and the "CM" symbol key 116 each carries a square stud 123 which extends through a vertical slot in a plate 124 connected to the plate 109 and spaced therefrom by two shoulder studs 125. The lower ends of the stems of the "TX" and "IN" symbol keys have right angled extensions, each carrying a square stud 126 (Fig. 5) each of which extends through its respective vertical slot in the partition plate 108. The studs 126 are in alignment with the studs 123.

A coil spring 127 (Fig. 3) laced between studs in the stems of the keys 116 and stationary studs in the plate 108 urges said keys upwardly and normally maintains the studs 123 and 126 in contact with the tops of the vertical slots in the plates 124 and 108.

Each of the symbol keys 116 carries a stud 128 (Figs. 3 and 4) which cooperates with its corresponding angular nose on its respective hook 129 formed in a locking detent 130 mounted for horizontal sliding movement between four rollers 131, loose on studs 132, secured in the plate 108 for this row of keys. The studs 128 also cooperate with angular camming surfaces 133, formed in a control plate 134, also slidably supported by the rollers 131. A spring 135 tensioned between the detent 130 and the plate 134, urges them forwardly and rearwardly respectively to normally maintain the angular noses of the hooks on the detent 130 and the angular camming surfaces 133 of the plate 134, in contact with the studs 128. A wall 136 of a recess in the control plate 134 (Figs. 3, 15, 16A and 16B) cooperates with a bent-over extension 137 of a zero latch 138, rotatable on a stationary stud 139 in one of the plates 108. The hook of the latch 138 normally engages a tooth 140 in a symbol actuator 141 to retain said actuator in zero or home position whenever the machine is operated with no symbol key depressed. The actuator 141 (Fig. 3) is mounted to shift horizontally by means of a slot in the rod 79 and by means of notches in the bar 80, which are engaged by the bifurcated end of said actuator 141.

Depressing one of the symbol keys 116 (Figs. 3, 4, and 15) causes the stud 128 to shift the detent 130 rearwardly until said stud passes beyond the corresponding hook 129 of said detent, whereupon the spring 135 returns the detent forwardly to latch the hook over a flat top surface of said stud 128 to retain the depressed symbol key. Depressing one of the symbol keys 116 also causes the stud 128 in cooperation with the camming surface 133 to shift the control plate 134 forwardly against the action of the spring 135 to rock the latch 138 counter-clockwise out of engagement with the tooth 140 to free the actuator 141 for movement. When no symbol key is depressed the zero latch 138 remains effective, as here shown, and locks the actuator 141 against movement during machine operation.

The left-hand row of symbol keys 117 (Figs. 1, 10, and 15) each carries a stud 142 which cooperates with corresponding hooks of a locking detent 143 and the angular camming surfaces of a control plate 144, similar in every respect to the detent 130 and the plate 134 (Figs. 3 and 4) for the right-hand row of symbol keys 116.

Figure 6A:
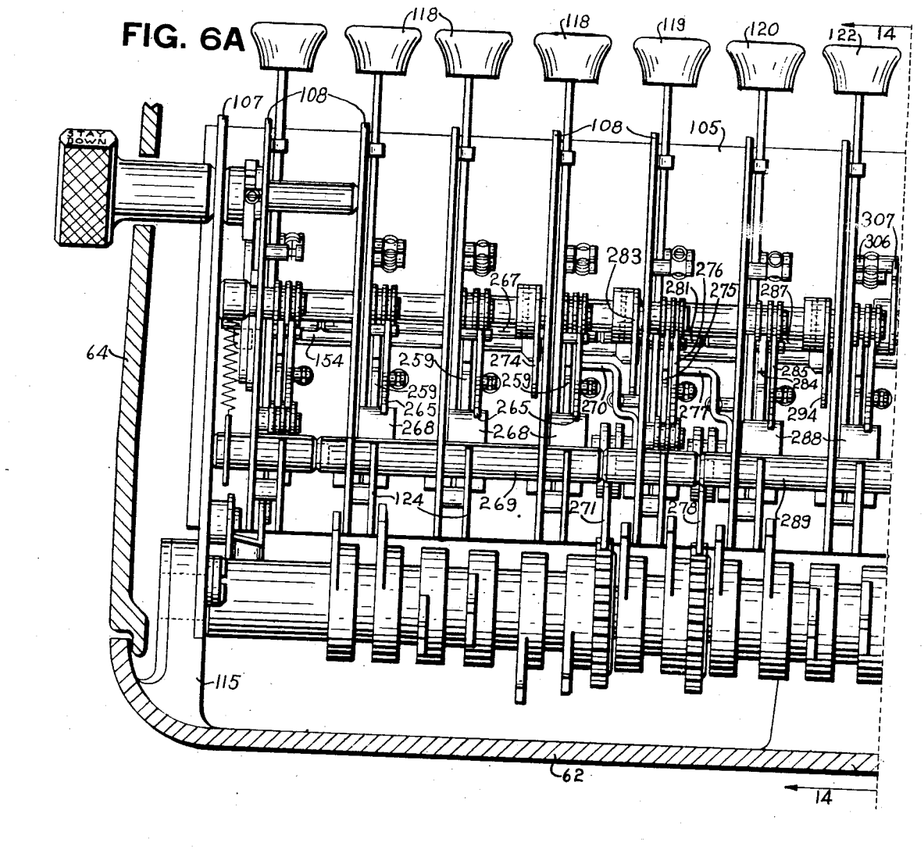
Figs. 6A and 6B together constitute an elevation of the auxiliary keyboard as observed from the front of the machine with the case broken away.
Figure 6B:
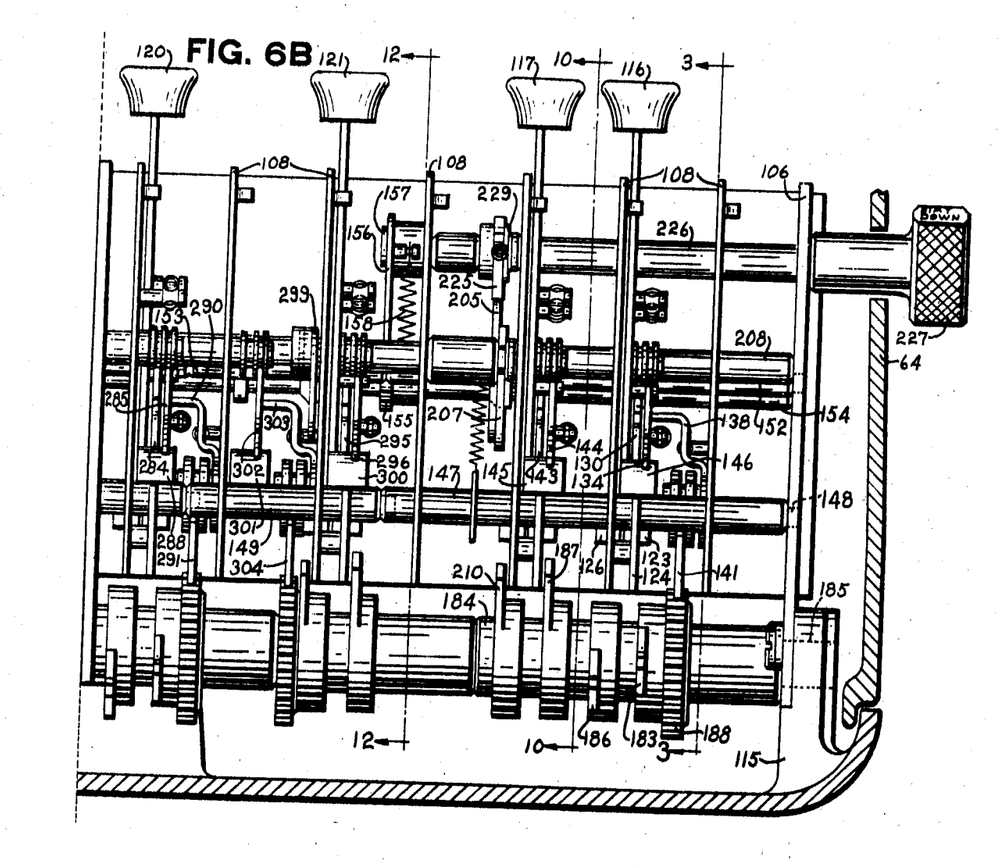

The control plates 144 and 134 for the symbol keys each has a notch in the front end thereof which is engaged respectively by the rounded ends of lugs 145 and 146 integral with a shaft 147 having a tenon 148 which fits loosely in a hole in the end plate 106 (Fig. 6B). The left-hand end of the shaft 147 has a recess therein which loosely engages a tenon on a shaft 149 for the year keys 121. The shafts 147 and 149 are journaled in holes in the partition plates 108 and similar shafts for the other groups of keys are mounted in alignment with, and in exactly the same manner as, the shafts 147 and 149, as clearly illustrated in Figs. 6 and 16. It is therefore evident that the control plates 144 and 134 are tied together and when one of the keys 117 is depressed, forward movement of the plate 144 rocks the plate 134 in unison therewith to rock the zero latch 138 counter-clockwise out of engagement with the tooth 140 of the actuator 141.

The locking detents 143 and 130 (Figs. 3, 11, and 15) are also tied together by means of notches in said detents in cooperation with lugs 150 and 151 integral with a symbol key release shaft 152 mounted in exactly the same manner as the shaft 147 by means of a tenon on the right end thereof, in cooperation with a recess in the end plate 106 (Fig. 6B) and by means of a recess in the left end thereof in cooperation with a tenon on a release shaft 153 for the year keys 121. The shafts 152 and 153 are further rotatably supported by holes in the partition plates 108. The two locking detents for the two rows of symbol keys are tied together so that releasing movement of the shaft 152 will release the depressed key in either of the two rows, in a manner later to be described. It is probably well to here state that each row of keys of the different groups has a locking detent and a control plate similar to those for the symbol keys, and in the case of the units of days keys 120 (Figs. 1 and 16A) and the month keys 118 the control plates and the locking detents are tied together in exactly the same manner as the control plates and locking detents for the two rows of symbol keys 116 and 117.

*Locking of keys during machine operation*

During machine operation the locking detents for the different rows of keys are locked against rearward movement, thus effectively locking the depressed keys of the auxiliary keyboard against release and the undepressed keys against depression. This is accomplished by means of a shaft 154 journaled in the auxiliary keyboard framework (Figs. 10, 12, 13 and 16B) and having cut therein a slot 160 for each of the locking detents of the auxiliary keyboard. The slots 160 are aligned with the locking detents and when the machine is at rest are so positioned that they are parallel to the upper edges of said locking detents, and provide sufficient clearance for the detents to slide back and forth upon depression of their corresponding keys. At the beginning of machine operation the shaft 154 is rotated 90 degrees in a clockwise direction to move the top surface of the slots 160 in said shaft at right angles to the top surface of the locking detents and into the path of the rearward ends of said detents, to lock them against movement during machine operation. The shaft 154 is rocked clockwise to locking position in the following manner:

Secured on the shaft 154 (Figs. 12 and 16B) is a pinion 155, which meshes with teeth in a segment 156 loose on a stud 157 in one of the plates 108. A spring 158 urges the segment 156 counter-clockwise to normally maintain a nose 159 thereof in contact with the bottom of a slot in a block 165 fast on the forward end of a link 166. A spring 167, one end of which is connected to the link 166, urges said link forwardly and downwardly to maintain the block 165 and the forward end of said link in an annular groove in a roller 168 loose on a stud 169 secured in the main keyboard framework, and to maintain the slot in the block 165 in contact with the nose 159. The rearward end of the link 166 is slotted to receive a stud 170 in a crank 171 secured on a shaft 172 journaled in the main keyboard framework. Also secured on the shaft 172 is an arm 173 carrying a stud 174 urged counter-clockwise, by a spring 175, into engagement with the upper end of a pitman 176 mounted for oblique sliding movement by means of a slot in the upper end thereof in cooperation with a stationary stud 178 and by means of the bifurcated lower end of said pitman 176 in cooperation with an annular groove in a hub 179 of an arm 180 secured on the main drive shaft 83. The spring 175 urges the pitman 176 downwardly to normally maintain a projection 181 thereof in contact with a stud 182 in the arm 180.

Figures 7, 9, 12, 13, 14, 17:
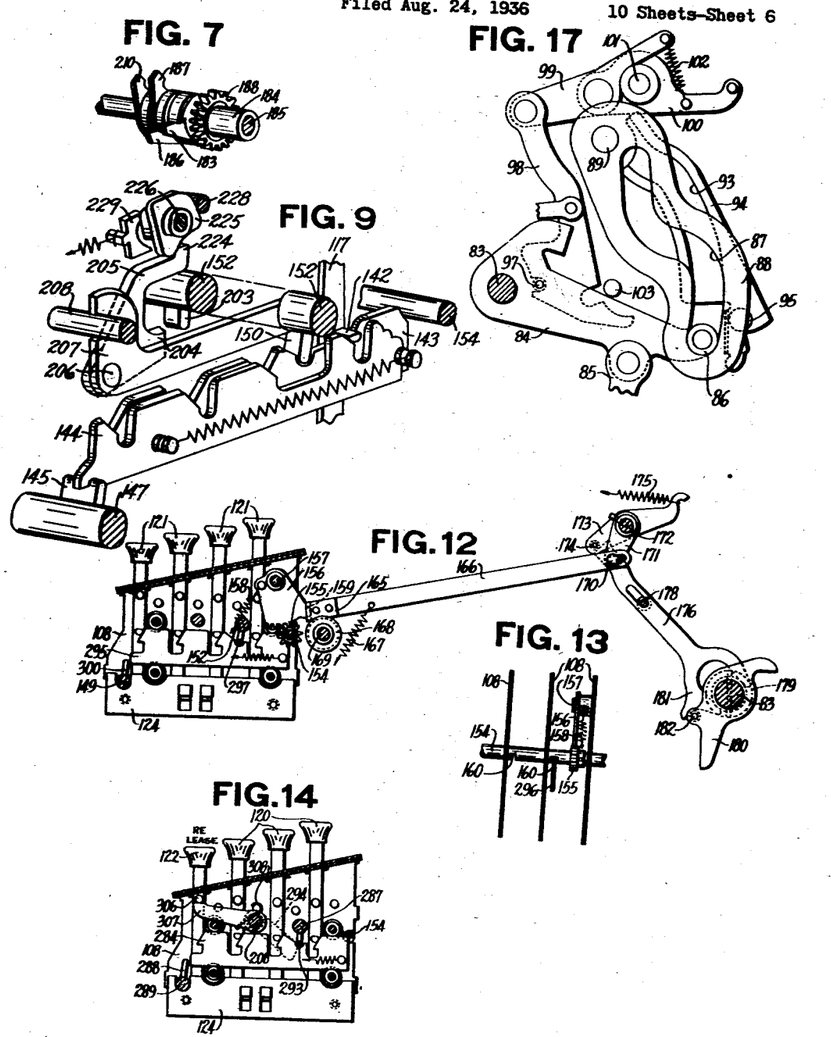
Fig. 7 is a perspective view of the actuator control cam for the symbol keys.
Fig. 9 is a perspective view of the mechanism for controlling the releasing of the symbol keys.
Fig. 12 is a sectional view taken along line 12—12 Fig. 6B, illustrating the mechanism that locks the keys of the auxiliary keyboard during machine operation.
Fig. 13 is a detail view of a part of the locking mechanism shown in Fig. 12.
Fig. 14 is a sectional view taken along line 14—14 Fig. 6A, showing the mechanism for manually releasing the keys of the auxiliary keyboard.
Fig. 17 is a detail view, as observed from the right, of the operating mechanism for the machine.

Initial movement counter-clockwise of the main drive shaft 83, under influence of the mechanism shown in Fig. 17, carries the arm 180 and the stud 182 in unison therewith to permit the pitman 176 to move downwardly under the influence of the spring 175 which simultaneously rocks the shaft 172 and the crank 171 counter-clockwise. Counter-clockwise movement of the crank 171 and the stud 170 frees the link 166 and the segment 156 to the action of the spring 158, which is strong enough to overcome the action of the spring 167 and rock the segment 156 counter-clockwise, to shift the link 166 rearwardly. Counterclockwise movement of the segment 156 rotates the pinion 155 and the shaft 154 clockwise approximately 90 degrees (Fig. 11) to cause the slots 160 in said shaft to obstruct movement of the locking detents of the auxiliary keyboard to lock the keys in the manner explained previously. Return movement clockwise of the main drive shaft 83, in the latter part of machine operation, reverses the movement of the parts to restore said parts to normal position, as shown in Fig. 12.

*Positioning of the symbol actuator*

Referring to Figs. 3 to 8 inclusive and Fig. 18, the studs 123 in the "star" and "CM" symbol keys 116, cooperate with a lug 183 on an actuator positioning sleeve 184 loose on a shaft 185, opposite ends of which are journaled in the upper extensions 115 of the base 62. The studs 126 in the "TX" and "IN" keys 116 cooperate with a lug 186 on the sleeve 184, and the corresponding studs in the lower ends of the left-hand row of symbol keys 117 (Fig. 10) cooperate respectively with lugs 187 and 210 on the actuator positioning sleeve 184. Integral with the sleeve 184 is a pinion 188 which meshes with rack teeth in the forward end of the actuator 141. The actuator 141 has a vertical slot through which extends a stud 189 in a downward extension of a printer positioning segment 190 rotatably supported by the shaft 89. A spring 191 tensioned between the segment 190 and the bail 92 of the leading frame 90 is tensioned to normally maintain a beak 192 of said segment in resilient engagement with the bail 92.

By way of illustration, depressing the "CM" key 116 (Fig. 3) moves the stud 123, in the lower end thereof, in the path of the lug 183 on the sleeve 184 and simultaneously rocks the zero latch 138 out of engagement with the tooth 140 in the actuator 141 to free said actuator for movement in unison with the leading frame 90. As previously explained, the arm 84 (Fig. 17) rocks the shaft 89 and the leading frame 90 first counter-clockwise and back to normal position. The spring 191 causes the segment 190 to move in unison with the bail 92 during initial movement counter-clockwise of the leading frame 90 to shift the actuator 141 rearwardly, which in turn rotates the sleeve 184 clockwise until the lug 183 contacts the stud 123 of the depressed symbol key 116. This prevents further movement of the actuator 141 and the segment 190 and differentially positions said actuator and said segment in accordance with the depressed symbol key. The leading frame 90 completes its initial movement counter-clockwise independently of the segment 190, flexing the spring 191. The differential positioning of the segment 190 is transmitted to the symbol type sector 67 (Fig. 3) by a link 193 which connects a rearward extension of said segment 190 to the sector 67.

The symbol type sector 67 is pivotally connected to the upper end of an arm 194 loose on the printer shaft 101 and has connected thereto a control plate 195, also loose on the shaft 101. When the segment 190 moves away from zero or home position a stud 196 in a forward extension thereof engages an arcuate surface 197 of the tail of a zero elimination pawl 198 pivoted at 199 in the printer framework, and rocks said pawl counter-clockwise against the tension of a spring 200 to disengage the tooth of said pawl from a similar tooth in the plate 195 to free the arm 194 and the sector 67 for printing movement.

After the shaft 89 (Figs. 3 and 17) and the leading frame 90 complete their initial movement counter-clockwise, the roller 86 in cooperation with the camming groove 93 rocks the arm 94 and the aligner shaft 95 clockwise to engage the aligning bar 96 with one of a series of tooth spaces in the downward extension of the segment 190 to align said segment and the printing sector 67 in set positions. After the segment 190 and the sector 67 have thus been positioned continued initial movement clockwise of the printer shaft 101 rocks a printing release trigger 201 (Fig. 3) counter-clockwise out of engagement with a tooth in the plate 195 to free said plate, the arm 194 and the printing sector 67 to the action of a spring 202 to print a symbol characteristic of the depressed symbol key upon a record sheet 211 (Fig. 2) wound around the platen roll 66.

Figure 2:
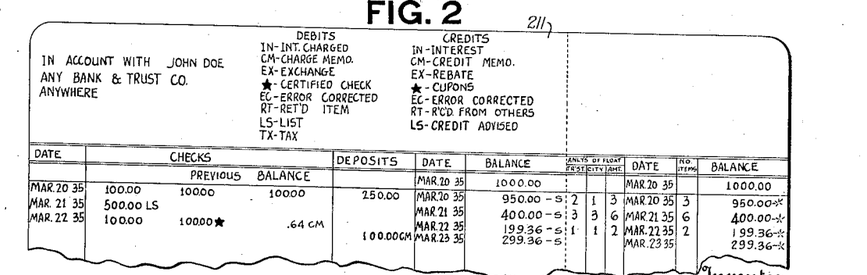
Fig. 2 is a facsimile of a fragment of a ledger sheet prepared in the machine of this invention.

The different symbols have one interpretation when used in connection with debit items and another interpretation when used in connection with credit items. These different interpretations are given in the two columns on the upper portion of the record sheet 211 headed respectively "Debits" and "Credits." For example: "CM" when used with a debit item means "charge memo" and when used with a credit item means "credit memo." Therefore the ".64 CM" item in the check column of the record sheet may be a bookkeeping charge and the "100.00 CM" item in the deposit column may be a check deposited to the credit of this particular account.

After imprinting is completed the aligning bar 96 (Fig. 3) is disengaged from the segment 190 and return movement clockwise of the leading frame 90 picks up the segment 190 and returns it and the actuator 141 to home position.

After the actuator 141 is returned to zero or home position the depressed symbol key is automatically released to permit the zero latch 138 to be spring-returned clockwise to effective position, as here shown, to retain the actuator 141 in home position whenever the machine is operated with no symbol key depressed. When the actuator 141 and the segment 190 are retained in home or zero position by the latch 138 the zero elimination pawl 198 remains effective as here shown, to obstruct printing movement of the plate 195, the arm 194, and the symbol sector 67.

*Release mechanism for the symbol keys*

Mechanism is provided to automatically release the depressed symbol key at the end of non-adding, adding, and subtracting operations and at the beginning of total and sub-total operations. Connections between the automatic releasing mechanism, and the "release" key 71 (Fig. 10) for the main keyboard, provide manual means for releasing the symbol keys. A manually operated device is provided for controlling both the automatic and manual releasing means for the symbol keys. The date keys are stay-down keys and consequently are never automatically released. However, the "release" key 122 (Fig. 1) provides a manual means for releasing the depressed date keys. The key releasing mechanism will now be described in detail.

The symbol key release shaft 152 (Figs. 9, 10, 11, and 15) in addition to having lugs 150 and 151 for the locking detents 143 and 130, has a similar lug 203 which cooperates with a rearward projection 204 of a control plate 205 pivoted at 206 to a slide 207 mounted for horizontal sliding movement in the auxiliary keyboard framework by means of a slot, in an upward extension thereof, cooperating with a rod 208 supported by the plates of the auxiliary keyboard and by means of an opening in the back plate 105 through which the rearward end of said slide 207 extends. The end of the slide 207, which protrudes through the opening in the back plate 105, has a slot which cooperates with a stud 209 in one end of a link 215 (Fig. 10), the other end of which is pivotally connected to one arm of a bell crank 216 secured on a key release shaft 217 for the main keyboard and journaled in the framework of said keyboard. Also secured on the release shaft 217 is a depending arm 218 with an inverted V shaped notch which engages a stud 219 in an upward extension of a key release bar 220 mounted for horizontal sliding movement by means of two horizontal slots therein, in cooperation with studs 221 and 222 fast in the left frame 61. The manner in which the bar 220 operates the slide 207 to release the depressed symbol keys will be explained later.

A spring 223 (Figs. 9, 10, and 11) urges the control plate 205 counter-clockwise to normally maintain an extension 224 thereof in contact with the periphery of a cam 225 secured on a shaft 226 journaled in the end plate 106 and several of the partition plates 108. Secured on the right-hand end of the shaft 226 and protruding through an opening in the case 64 is a knob 227 for manually rotating the cam 225. The knob 227 and the cam 225 have two positions, "stay-down" and "not stay-down," and when said knob and said cam are in "stay-down" position, as shown in Figs. 9 and 10, the high portion of the periphery of the cam 225 positions the control plate 205 so that the projection 204 thereof is out of the path of the lug 203 on the shaft 152. Consequently when the slide 207 is reciprocated, first rearwardly and then back to normal position, either manually or automatically, in a manner presently to be described, no movement is imparted to the shaft 152 and therefore the depressed symbol key will not be released.

Figure 11:
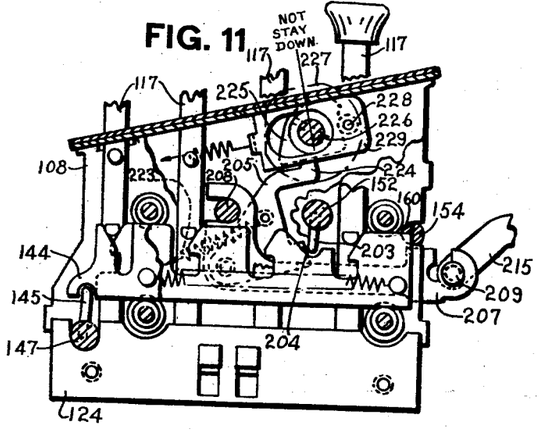
Fig. 11 is a detail view of the release controlling mechanism for the symbol keys.
Figure 15:
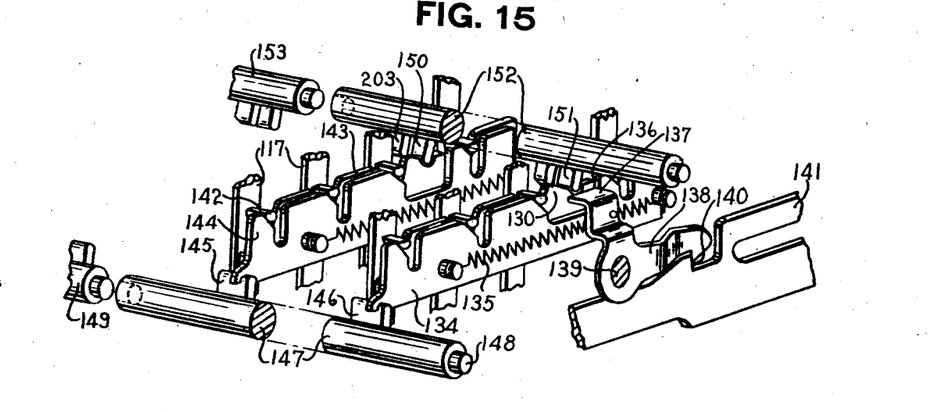
Fig. 15 is a perspective view of the control plates for one group of keys of the auxiliary keyboard.
Figure 16A:
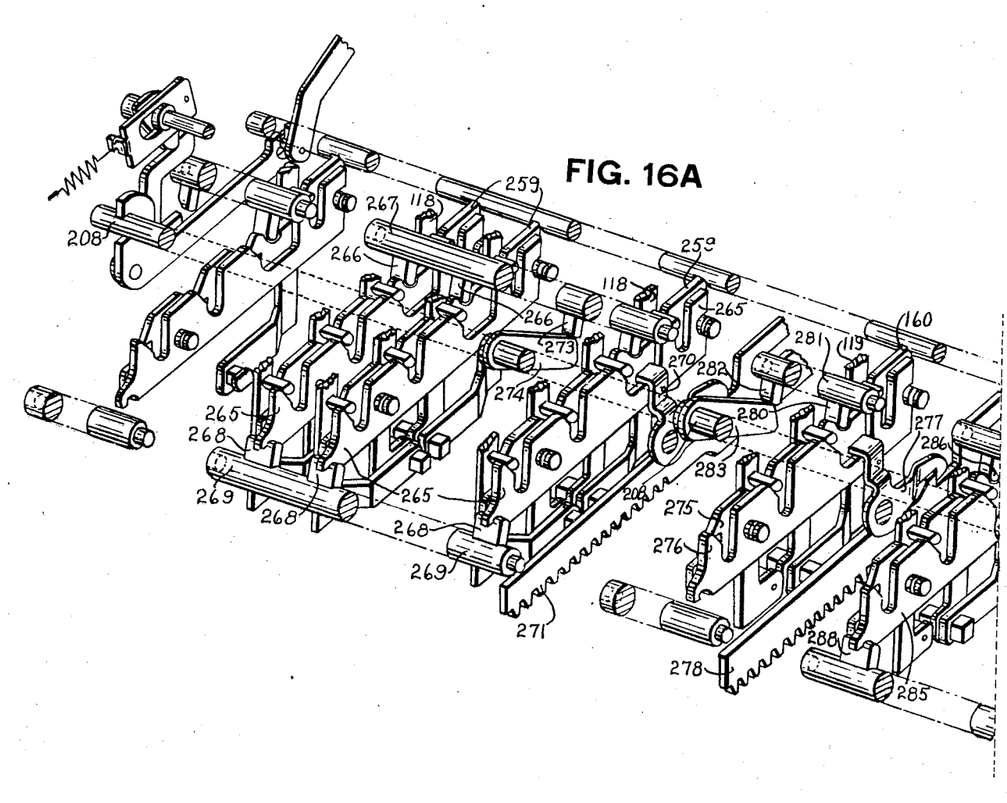
Figs. 16A and 16B taken together constitute a disassembled perspective view of the auxiliary keyboard mechanism.
Figure 16B:
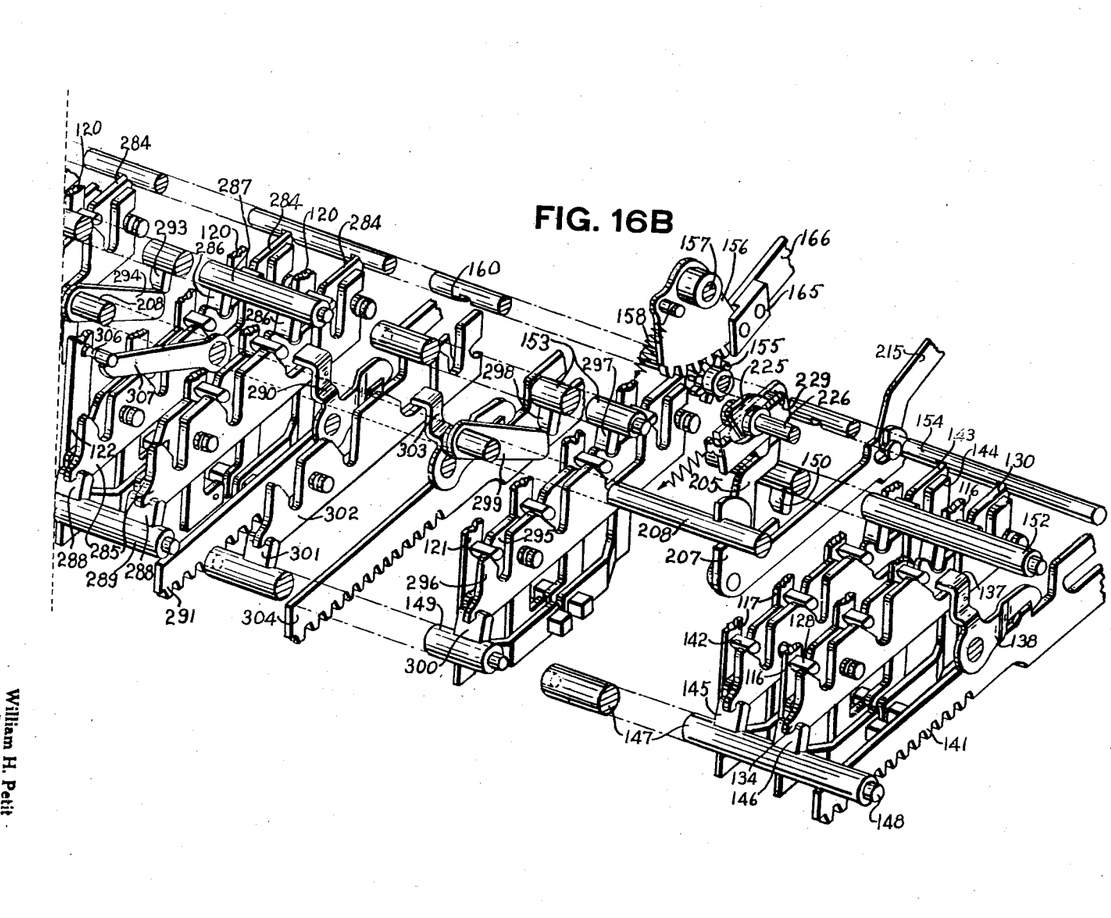

Turning the knob 227 to "not-stay-down" position, as shown in Fig. 11, moves a low portion of the periphery of the cam 225 opposite the extension 224 (see also Figs. 9, 15, and 16B) to permit the spring 223 to rock the control plate 205 counter-clockwise to move the projection 204 thereof upwardly into the path of the lug 203. This causes the reciprocating movement of the slide 207 to rock the shaft 152, and the lugs 150 and 151 first counter-clockwise to shift the locking detents 143 and 130 rearwardly to disengage the corresponding hook 129 of either of said detents from the studs 142 or 128 in the depressed symbol key 117 or 116 to permit said key to be spring-returned upwardly to undepressed position. Two notches in the periphery of the cam 225 (Figs. 6B, 9 and 11) corresponding to the "stay-down" and the "not-stay-down" positions of said cam, in cooperation with a stud 228 in a spring-pulled slide 229, maintains the cam 225, the shaft 226, and knob 227 in set positions. The slide 229 is slidably mounted on the shaft 226 by a slot therein in cooperation with said shaft.

The release key 71 (Fig. 10) has pivotally connected thereto one end of a toggle link 230, the other end of which is bifurcated to straddle a stud 231 in the bar 220. Depressing the release key 71, by means of the link 230, shifts the bar 220 rearwardly, which by means of the stud 219 in cooperation with the arm 218 rocks the shaft 217 and the bell crank 216 counter-clockwise. Counter-clockwise movement of the bell crank 216, by means of the link 215, shifts the slide 207 rearwardly to release the depressed symbol key in the manner explained above.

Pivoted on a stud 232 in the bar 220 is a key release pawl 233 urged clockwise by a torsion spring 234 to normally maintain the bottom surface of a hook 235 thereon in contact with a roller 236 mounted on a disk 237 secured on the main drive shaft 83. It will be recalled, by referring to Fig. 17, that the main shaft 83 is oscillated first counter-clockwise and back to normal position. In non-adding, adding, and subtracting operations initial movement counter-clockwise of the main shaft 83 and the disk 237 causes the roller 236 to move beyond the hook 235, whereupon the torsion spring 234 urges the pawl 233 clockwise to latch said hook 235 over said roller 236. Return movement clockwise of the shaft 83 and the disk 237 causes the roller 236 to engage the hook 235 to shift the bar 220 rearwardly to rock the shaft 217 counter-clockwise, which by means of the bell crank 216 and the link 215 shifts the slide 207 rearwardly to rock the symbol key release shaft 152 counter-clockwise, when the knob 227 (Fig. 6B) is in "not stay-down" position, to release the depressed symbol key. Before the disk 237 and the roller 236 are fully returned clockwise to normal position an upward extension 238 of the pawl 233 engages a stationary stud 240 to disengage the hook 235 from the roller 236 to permit return of the bar 220 and connected mechanism to normal position under influence of the springs 135 (Fig. 15) tensioned between the locking detents and the control plates.

In the beginning of total and sub-total operations it is necessary to shift the bar 220 rearwardly in order to release any amount keys that have been inadvertently or carelessly depressed. This shifting of the bar 220 likewise releases any depressed symbol key when the knob 227 is in "not stay-down" position.

A latch 241 (Fig. 10), for the "sub-balance" key 71, is pivoted on a stud 242 in the left frame 61, and has pivotally connected to the lower end thereof a lever 243 carrying a stud 244 which cooperates with a tail 245 of a key release pawl 246 fulcrumed at 247 to a downward extension of the bar 220. The pawl 246 has a notch 248 adapted to engage a roller 249 on a lever 250 pivoted on a stationary stud 251 in the frame 61. A spring 252 urges the lever 250 clockwise to normally maintain a camming surface of said lever in contact with a roller 253 mounted on the disk 237. The torsion spring 234 tends to engage the pawl 246 with the roller 249. However, a spring 254, one end of which is connected to the lever 243, is strong enough to overcome the action of the spring 234 and maintain the pawl 246 disengaged from the roller 249 and to normally maintain the lever 243 in contact with a collar 255 on the stud 222.

Selecting any one of the totalizers for a total or sub-total operation rocks the lever 243 clockwise, Fig. 10, in the manner shown in the patents referred to at the beginning of this specification, to permit the spring 234 to urge the notch 248 in the pawl 246 into engagement with the roller 249. Initial movement counter-clockwise of the shaft 83 and the disk 237 causes the roller 253 to engage a hump 256 on the camming surface of the lever 250 to rock said lever counter-clockwise to shift the pawl 246 and the bar 220 rearwardly to release any depressed amount or symbol keys at the beginning of machine operation. After the keys have been released, the pawl 246 is disengaged from the roller 249 by a roller 257, carried by the disk 237, engaging a raised portion 258 of said pawl 246 and rocking said pawl clockwise. This permits the bar 220 and associated mechanism to be immediately spring-returned forwardly to normal position, as here shown. Before the roller 257 moves away from the raised surface 258, upon return movement clockwise of the disk 237, the lever 243 is released to the action of the spring 254, which returns said lever counter-clockwise to normal position, as here shown, in which position the stud 244 in cooperation with the tail 245 retains the notch 248 out of engagement with the roller 249 when the roller 257 moves beyond the raised surface 258.

*Date keys*

As previously stated, the date keys are not automatically released at the end of machine operations, but manual means is provided for releasing these keys when desired. Referring to Figs. 1, 6A, 16A, and 18, each of the three rows of month keys 118 has a locking detent 259, and a control plate 265, which are similar in every respect to the locking detent 130 and the control plate 134 (Figs. 3 and 4) for the symbol keys 116. The locking detents for the month group of keys are tied together by means of lugs 266 on a shaft 267 and the control plates 265 are tied together by means of lugs 268 on a shaft 269. The control plates 265 control a zero latch 270 which cooperates with a month actuator 271 to position a month printer control segment 272 (Fig. 18) and its corresponding printing sector in exactly the same manner as explained for the actuator mechanism for the symbol keys. The shaft 267 has another lug 273 which cooperates with the rounded nose of a release arm 274 secured on the shaft 208.

The three tens of days keys 119 have a locking detent 275 and a control plate 276, said control plate adapted to control a zero latch 277 for an actuator 278, which positions a printer control segment 279 (Fig. 18) and its corresponding printing sector in accordance with the depressed key 119. A notch in the locking detent 275 engages the rounded end of a lug 280 on a shaft 281 and another lug 282 on said shaft 281 is adapted to be engaged by the rounded nose of an arm 283, similar to the arm 274, and secured on the shaft 208.

Each of the three rows of units of days keys 120 (Figs. 1, 6A, 16A, and 18) has a locking detent 284 and a control plate 285, and said locking detents are tied together by means of lugs 286 on a shaft 287 and said control plates 285 are tied together by means of notches in the forward ends thereof, in cooperation with the rounded ends of lugs 288 integral with a shaft 289. When one of the units of days keys 120 is depressed, the control plates 285 rock a zero latch 290 out of engagement with a units of days actuator 291, thus permitting said actuator 291 to position its corresponding segment 292 (Fig. 18) and the units of days printing sector in accordance with the depressed key. The shaft 287 carries a lug 293 (Fig. 16B) which cooperates with the rounded end of an arm 294 fast on the shaft 208.

The single row of year keys 121 has a locking detent 295 and a control plate 296, said locking detent being notched to receive the rounded end of a lug 297 integral with the shaft 153, which also has integral therewith a depending lug 298 which cooperates with the rounded end of an arm 299 secured on the shaft 208. The forward end of the control plate 296 is notched to receive the end of a lug 300, fast on the shaft 149, which also has integral therewith a similar lug 301, which engages a notch in the forward end of a control plate 302 which cooperates with a zero latch 303 for the year actuator 304. When one of the year keys is depressed, the plates 296 and 302 are rocked forwardly in unison to rock the latch 303 out of engagement with the actuator 304 to permit said actuator, its associated segment 305 (Fig. 18) and printing sector to be positioned commensurate with the value of the depressed year key in exactly the same manner as explained for the symbol keys.

The shafts 267, 281, 287, 153, and 152 (Figs. 16A and 16B), for coupling the locking detents of the different groups of keys, are journaled in the plates that form the framework for the auxiliary keyboard assembly and are maintained in axial alignment by means of tenons on the end of one shaft in cooperation with a recess in the end of the adjacent shaft. The shafts 269, 289, 149 and 147, for coupling the different control plates, are mounted in axial alignment in the auxiliary keyboard framework in exactly the same manner as explained for the coupling shafts for the locking detents.

Figure 1:
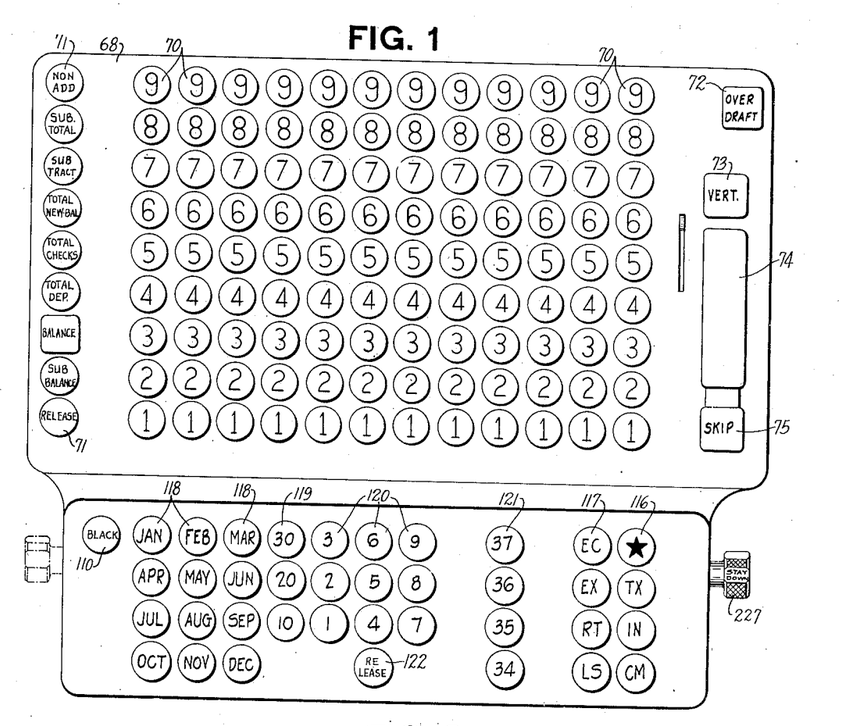
Fig. 1 is a diagrammatic top plan view of the main and auxiliary keyboards of the machine embodying the invention.

By referring to Fig. 1 it will be seen that the "release" key 122 is in alignment with one of the rows of the units of days keys 120, and is depressibly mounted in the auxiliary keyboard framework in exactly the same manner as the "CM" symbol key 116 (Fig. 4), which has been fully explained hereinbefore. Depressing the "release" key 122 (Figs. 14 and 16B) causes a stud 306 therein, in cooperation with the forward end of an arm 307 secured on the shaft 298, to rock said arm and said shaft counter-clockwise against the action of a torsion spring 308. Counter-clockwise movement of the shaft 208 causes the arms 274, 283, 294, and 299, which are secured thereon, in cooperation with their corresponding lugs 273, 282, 293, and 298, to rock the shafts 267, 281, 287, and 153 counter-clockwise to shift the locking detents for the different groups of date keys rearwardly to release the depressed date keys.

When the pressure is removed from the "release" key 122, the spring 308 returns the shaft 208 and the arms mounted thereon to normal position and the springs tensioned between the locking detents and the control plates for the date keys restore said detents and plates to normal position.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a calculating machine, the combination of a plurality of rows of keys; an actuator controlled by said rows of keys; a movable means to latch the actuator in home or a neutral position; a slidable control plate for each row of keys, one of said control plates being operatively connected to the latching means; and separately mounted means to connect the control plates so that depression of any key in any of the rows will cause the control plate connected to the latching means to slide to thereby move the latching means to ineffective position.

2. In a calculating machine, the combination of a plurality of rows of keys; an actuator controlled by said rows of keys; means effective when no key is depressed to latch the actuator in a neutral position during machine operations; a control plate for each row of keys, one of said plates being connected to the latching means; and means including a shaft and a projection on said shaft for each control plate to connect said control plates for unitary movement so that depression of any key in any row will move the latching means to ineffective position.

3. In a machine of the class described, the combination of a plurality of rows of keys, constituting one group or one denominational order; an actuator controlled by said rows of keys; means to drive the actuator; means, effective when no key is depressed, to retain the actuator against movement by the driving means; a control plate for each row of keys, one of said control plates connected to the retaining means; a shaft; means on the shaft to connect the control plates for unitary movement, whereupon depression of any key in the group moves the retaining means to ineffective position; a rotatable member connected to the actuator and adapted to be operated thereby; and means on the member cooperating with the depressed key to position the actuator in accordance with said depressed key.

4. In a calculating machine, the combination of an actuator; means to impart reciprocating movement to the actuator during machine operations; a rack on the actuator; a member having a gear thereon meshing with the rack whereby the member is rotated by the actuator upon reciprocation of the actuator; projections on the member; and a plurality of rows of keys, a plurality of said keys cooperating with each of the projections to control the positioning of the actuator.

5. In a machine of the character described, the combination of a plurality of rows of keys; a single actuator for the rows of keys movable in a plane parallel with the arrangement of the rows of keys; a means to reciprocate the actuator each machine operation; a shaft under said rows of keys; a member rotatable on said shaft and driven by the actuator upon reciprocation thereof; and means whereby depressing any one of the keys in the several rows controls the rotation of the member to control the extent of the initial movement of the single actuator to cause the single actuator to assume a position determined by the depressed key.

6. In a machine of the class described, the combination of a plurality of rows of depressible keys; an actuator; means to drive the actuator during each machine operation; a shaft mounted below said rows of keys; a member rotatable on said shaft and extending across said rows of keys at right angles thereto; means for rotating the member by the actuator; and a plurality of means on the member selectively cooperable with the keys when depressed to limit the travel of the member to position the actuator to a position determined by the depressed key.

7. In a machine of the class described, the combination of a group of keys arbitrarily arranged in a plurality of rows; a single actuator associated with said group of keys, the actuator and rows of keys arranged in fixed planes parallel with each other; a control device rotatably mounted at right angles to the plane of movement of the actuator and extending across the planes of the rows of keys; a geared connection between the control device and said single actuator; and tappets on the control device coacting with the keys, said tappets being less in number than the number of keys coacting therewith, each tappet coacting with a plurality of keys to control the differential movement of the actuator.

8. In a machine of the class described, the combination of a group of keys being arbitrarily arranged in a plurality of rows; a single actuator controlled by said group of keys, the actuator movable in a plane parallel with the rows of keys, said planes being in fixed relationship with each other; a control device rotatable about a support mounted at right angles to the plane of movement of the actuator; a geared connection between the control device and said single actuator; and tappets on the control device located beneath the keys, said tappets being less in number than the number of keys located above the tappets, each tappet coacting with a plurality of keys to control the differential movement of the actuator.

9. In a machine of the class described, the combination of a group of keys arbitrarily arranged in a plurality of rows; a single actuator controlled by said group of keys, the actuator movable in a plane parallel with the planes of the rows of keys; a control device rotatable about a support mounted at right angles to the plane of movement of the actuator, said control device having tappets integral and rotatable therewith to engage the keys, said tappets being less in number than the number of keys and each tappet coacting with a plurality of keys to control the differential movement of the actuator; a geared connection between the control device and said single actuator; and main operating means to operate the actuator only after one of the keys has been moved into position to coact with a tappet.

10. In a machine of the class described, the combination of a plurality of rows of keys constituting one group or one denominational order; a single actuator for said rows of keys; means to drive the actuator; a member operatively connected to the actuator and cooperating with the keys to position the actuator; a movable means, effective when no key is depressed, to prevent movement of the actuator by the driving means; a control plate for each row of keys and operable by the depression of any one of said keys, one of which plates is connected to the movable means; rockable means; and means on the rockable means engaging the control plates to connect the control plates for unitary movement, whereupon depression of any one of the keys causes the rocking of the rockable means to cause said one control plate to move the preventing means to ineffective position.

11. In a calculating machine, the combination of a plurality of rows of keys, constituting one group or one denominational order; an actuator controlled by the rows of keys; means to drive the actuator; a movable means to latch the actuator in a neutral position when no key is depressed; a control plate adjacent each row of keys; means on each key engaging the control plate adjacent thereto to operate the adjacent control plate; means connecting the latch to one of said control plates for movement thereby; separately mounted means connecting the control plates for joint operation so that said one control plate can move the latching means to ineffective position upon depression of any key, to permit the driving means to drive the actuator; and means operatively connected to the actuator and cooperating with the depressed key to position the actuator in accordance with the depressed key.

WILLIAM H. PETIT.